United States Patent [19]

Hyodo et al.

[11] Patent Number: 5,420,872
[45] Date of Patent: May 30, 1995

[54] APPARATUS FOR CONCEALING ERROR IN TRANSFORM CODING OF A MOTION PICTURE

[75] Inventors: Masaaki Hyodo, Kita-Katsuragi; Hiroyuki Katata; Yoji Noguchi, both of Nara, all of Japan

[73] Assignee: Sharp K.K., Osaka, Japan

[21] Appl. No.: 984,975

[22] Filed: Dec. 3, 1992

[30] Foreign Application Priority Data

Dec. 4, 1991 [JP] Japan .................. 3-320461

[51] Int. Cl.$^6$ ............ G06F 11/00; H04L 1/00
[52] U.S. Cl. ................................. 371/31; 348/616
[58] Field of Search ........... 371/31, 38, 37.1, 2.1, 371/37.4; 348/384, 616, 407

[56] References Cited

U.S. PATENT DOCUMENTS

| | | | |
|---|---|---|---|
| 4,716,565 | 12/1987 | Suma | 371/31 |
| 4,718,067 | 1/1988 | Peters | 371/38 |
| 4,792,953 | 12/1988 | Pasdera et al. | 371/31 |
| 4,807,033 | 2/1989 | Keesen et al. | 348/616 |
| 5,070,503 | 12/1991 | Shikakura | 371/37.1 |
| 5,140,417 | 8/1992 | Tanaka et al. | 348/384 |
| 5,243,428 | 9/1993 | Challapali et al. | 358/167 |

FOREIGN PATENT DOCUMENTS

| | | |
|---|---|---|
| 0514188A2 | 11/1992 | European Pat. Off. . |
| 61-147690 | 7/1986 | Japan . |
| 3022735 | 1/1991 | Japan . |

OTHER PUBLICATIONS

"Digital-Video Recording Techniques", pp. 122–124, The Nikkan Kogyo Shimbun Ltd., Tokyo, Japan.
M. Saito, "An Error Concealment Method Against Transmission Error in DCT Coding", PCS91, 6. 5-1, pp. 185–188.

*Primary Examiner*—Roy N. Envall, Jr.
*Assistant Examiner*—Emmanuel Moise
*Attorney, Agent, or Firm*—David G. Conlin; Milton Oliver

[57] ABSTRACT

An apparatus for concealing an error of a moving pictures transform coding includes the first concealment circuit (19) for analyzing data according to a type of the data, the data being error-detected but not corrected by an error correction decoding by the decoder (12), for replacing the data with a specific data according to the analyzed result by using a predetermined method, and for outputting a specific signal therefrom, and the second concealment circuit (22) connected to the first concealment circuit (19) for replacing reproduced pixel values of an error-occurred block with reproduced pixel values of a previous frame according to the signal output from the first concealment circuit (19) in case that the data being error-detected but not corrected is data of a predetermined frequency component or data of an additional information.

8 Claims, 18 Drawing Sheets

APPARATUS FOR CONCEALING ERROR IN TRANSFORM CODING OF A MOTION PICTURE

BACKGROUND OF THE INVENTION

1. Field of the Invention

The present invention relates to an apparatus for concealing an error of an orthogonal transform coding which is adapted to conceal an error of an image data read out when the coded image data is decoded.

2. Description of the Related Art

In general, for efficiently recording a digital moving pictures on a magnetic tape or a disk or transmitting it on a line, the moving pictures data is efficiently coded for reducing the quantity of information to be recorded or transmitted.

The inventors of the present application know a method, which has been proposed in the Japanese Patent Application No. 3-11882 by some of the inventors of the present application, in order to efficiently code the moving pictures data.

The above-mentioned method is arranged to divide one-screen data, that is, one-frame data into several blocks, each block consisting of 8-by-8 pixels, orthogonally transform each of those blocks, and quantize each transform coefficient in the light of the statistical quality of the block.

After quantizing the transform coefficients, the quantized data and the additional information accompanied with it are error-correcting coded if any. The data which is error-correcting coded data is recorded on a recording medium.

In order to read the data recorded by the foregoing method, there may be a value to be erroneously read out. For the error-corrected code, when it is read out, it is decoded in an error-correcting manner. Then the location of some erroneous data is detected. Further, some of error detected data is corrected.

However, there may be left some pieces of data error-detected but non-corrected. That is, those pieces of data are found to be erroneous but the correct values about those pieces of data are not found out. If the moving pictures data is decoded with the erroneous data included therein, the reproduced image is made inferior in quality.

Against the data whose error is found but not corrected, the error modification is performed so as to suppress the erroneous values by using the correlation in the frame.

As a first known method for concealing an error on the reproduced image, the actual pixel values about an erroneous pixel is measured from the pixels around the erroneous pixel and the measured pixel values are replaced with the erroneous pixel. For example, as shown in FIG. 1, the reference alphabets a to f denote pixel values, respectively. If a value of e is found to be erroneous after the error detection is done, as indicated in the following expression (1), a value of e is measured from the pixels around the erroneous value of e. The erroneous value of e is replaced with the measured value of e'.

$$e' = (b+d)/2 \quad (1)$$

As a second known method for concealing an error, as disclosed in the Japanese Patent Laying Open No. 61-147690, at first, the image is broken into several blocks. For each block, an additional code and a coded data are derived. The additional code consists of a minimum value of the pixel values of the block and a dynamic range about all the pixel values within the block. The coded data is formed by quantizing the difference between each pixel values and a minimum value of the pixel values of the block. If the additional code is found to be erroneous, the average value of the additional coded values around the erroneous coded data is derived as a measured value and the erroneous coded data is replaced with the measured value.

In the case of using the transform coding method, an error takes place not in a specific pixel values but a transform coefficient. If the inverse transformation is performed with respect to the block data including the erroneous transform coefficient, the error gives an adverse effect on the overall block. Hence, all the pixel values included in the block are all made erroneous on the reproduced image.

In the first known method for concealing an error, a real value is measured from the pixel values around the erroneous pixel. Therefore, if the pixel values around the erroneous pixel is properly reproduced, this first known method is effective. However, if the pixels around the erroneous pixel include one or more erroneous ones, this method is not properly effective. For example, consider that the pixels of a to f shown in FIG. 1 are all erroneous. If a value of e is measured from the pixels around the pixel of e by means of the expression (1) for concealing the value of e, the measuring accuracy is degraded because the values of b and d used for measuring the value of e are erroneous. That is, the first known concealing method is not effective if some or all the pixels on the block are erroneous.

The foregoing second known concealing method is arranged to measure the additional information greatly influencing the overall block such as a minimum value of the pixel values of one block and a dynamic range about all the pixels of one block by using the correlation among the block and its adjacent blocks. If the correlation among the error-included block and its adjacent blocks is large, the second known concealing method is effective. However, if the correlation is small, the modified pixel values on the overall block may be far away from the real pixel values.

As another disadvantage, if the erroneous pixel values(s) greatly influence(s) the overall block, a slight difference between the measured value(s) and the real value(s) brings about a visually large defect on the reproduced image. Further, since the average value is used as the measured value, the overall image become disadvantageously dull.

SUMMARY OF THE INVENTION

It is an object of the present invention to provide an apparatus for concealing an error of a moving pictures transform coding which may properly consider the quality of a transform coefficient and the correlation on time.

The object of the present invention can be achieved by an apparatus for concealing an error of a moving pictures transform coding, the apparatus having coding unit for error correction of image data and decoding unit for error-correcting code created by the coding unit, includes first concealment unit for analyzing data according to a type of the data, the data being error-detected but not corrected by an error correction decoding by the decoding unit, and for replacing the data with a specific data according to the analyzed result by using a predetermined method, and a second concealment unit connected to the first concealment unit for replacing reproduced pixel values of an error-occurred block with reproduced pixel values of a previous frame in case that the data being error-detected but not corrected is data of a predetermined frequency component.

Preferably, the second concealment unit is further adapted to replace the reproduced pixel values of the error-occurred block with the reproduced pixel values of the previous frame in case that the data being error-detected but not corrected is data of an additional information.

More preferably, the first concealment unit is adapted to output a specific signal, and the second concealment unit is adapted to replace the reproduced pixel values of the error-occurred block with the reproduced pixel values of the previous frame according to the signal output from the first concealment unit.

Further preferably, the first concealment unit is adapted to output the specific signal in case that the data is data of a first frequency component or data of an additional information.

The first concealment unit is preferably adapted to replace the data with zero when the data corresponds to data of a second frequency component.

The first concealment unit is preferably adapted to replace the data with data of a frequency component which is the same as a frequency component of horizontally adjacent block when the data corresponds to data of a third frequency component.

The first concealment unit is preferably adapted to replace the data with data of a frequency component which is the same as a frequency component of vertically adjacent block when the data corresponds to data of a fourth frequency component.

In operation, the first concealment unit serves to perform an error-correcting decode operation and analyze the error-detected but non-corrected data according to the type of data, feed a specific signal when the analyzed data corresponds to the data of the first frequency component or the additional information, replace the data with zero when the data corresponds to the data of the second frequency component, replace the data with the data of the third frequency component in the horizontally adjacent block when the data corresponds to the data of the third frequency component, and replace the data with the data of the fourth frequency component in the vertically adjacent block when the data corresponds to the data of the fourth frequency component.

The second concealment unit is connected to the first concealment unit and serves to replace the reproduced pixel values of the error-occurred block with the reproduced pixel values of the previous frame when the error-detected but non-corrected data corresponds to the data of a predetermined frequency component or additional information, based on the signal fed from the first concealment unit.

Hence, if the input data is found to be erroneous, the most approximate concealing method is selected in the light of temporal and spatial at each frequency component of the data. This makes it possible to obtain an excellent reproduced image if an error is included in the input data.

The object of the present invention also can be achieved by an apparatus for concealing an error of a moving pictures transform coding, the apparatus having coding unit for assuming one field or one frame of the digital moving pictures as one screen, dividing data of one screen into a plurality of blocks, deriving a transform coefficient by orthogonally transforming the image data at each block, quantizing the transform coefficient of each block with predetermined number of bits, error correction coding a quantized index together with an additional information indicating a quantizing bit number, the apparatus further having decoding unit for decoding an error-correcting code created by the coding unit, includes the first concealment unit for analyzing data according to a type of the data, the data being error-detected but not corrected by an error correction decoding by the decoding unit, for replacing the data with a specific data according to the analyzed result by using a predetermined method, and for outputting a specific signal therefrom, and the second concealment unit connected to the first concealment unit for replacing reproduced pixel values of an error-occurred block with reproduced pixel values of a previous frame according to the signal output from the first concealment unit in case that the data being error-detected but not corrected is data of a predetermined frequency component or data of an additional information.

Preferably, the first concealment unit serves to output a specific signal when the data is data of a first frequency component or data of the additional information, replace the data with zero when the data is data of a second frequency component, replace the data with data of the same frequency component at its horizontally adjacent block when the data is data of a third frequency component, and replace the data with data of the same frequency component at its vertically adjacent block when the data is data of a fourth frequency component.

In operation, the first concealment unit serves to perform an error-correcting decode operation and analyze the error-detected but non-corrected data according to the type of data, feed a specific signal when the analyzed data corresponds to the data of the first frequency component or the additional information, replace the data with zero when the data corresponds to the data of the second frequency component, replace the data with the data of the third frequency component in the horizontally adjacent block when the data corresponds to the data of the third frequency component, and replace the data with the data of the fourth frequency component in the vertically adjacent block when the data corresponds to the data of the fourth frequency component. The second concealment unit serves to replace the reproduced pixel values of the error-occurring block with the reproduced pixel values of the previous frame when the error-detected but non-corrected data corresponds to the data of a predetermined frequency component or additional information, based on the signal fed from the first modifying unit.

Hence, if the input data is found to be erroneous, the most approximate concealing method is selected in the light of temporal and spatial at each frequency component of the data. This makes it possible to obtain an excellent reproduced image if an error is included in the input data.

The object of the present invention can be further achieved by an apparatus for concealing an error of a moving pictures transform coding, which includes a coding unit for assuming one field or one frame of the digital moving pictures as one screen, dividing data of one screen into a plurality of blocks, deriving a transform coefficient by orthogonally transforming the image data at each block, quantizing the transform coefficients of each block with predetermined number of bits, error correction coding a quantized index together with an additional information indicating a quantizing bit number, a decoding unit for decoding an error-correcting code created by the coding unit, and a concealment unit for analyzing data according to a type of the data, the data being error-detected but not corrected by an error correction decoding by the decoding unit, for replacing the data with a specific data according to the analyzed result.

Preferably, the concealment unit is adapted to replace the data with data of the same frequency component in a block at the same location of a previous frame when the data is data of a fifth frequency component.

More preferably, the concealment unit is adapted to replace the data with zero when the data is data of a sixth frequency component.

Further preferably, the concealment unit is adapted to replace the data with data of the same frequency component of its horizontally adjacent block when the data is data of a seventh frequency component.

The concealment unit is preferably adapted to replace the data with its vertically adjacent block when the data is data of an eighth frequency component.

In operation, the concealment unit serves to perform the error-correcting decode operation about the moving pictures data, analyze the error-detected but non-corrected data according to the type of the data, replace the data with the data of the fifth frequency component of the block on the same location of the previous frame when the data corresponds to the data of the fifth frequency component, based on the analyzed result, replace the data with zero when the data corresponds to the data of the sixth frequency component, replace the data with the data of the seventh frequency component of the horizontally adjacent block when the data corresponds to the data of the seventh frequency component, replace the data with the data of the eighth frequency component of the vertically adjacent block when the data corresponds to the data of the eighth frequency component.

This makes it possible to obtain an excellent reproduced image if the error is included in the input data.

Further objects and advantages of the present invention will be apparent from the following description of the preferred embodiments of the invention as illustrated in the accompanying drawings.

DESCRIPTION OF THE PREFERRED EMBODIMENTS

Referring to the accompanying drawings, an embodiment of an apparatus for concealing an error of a moving pictures transform coding according to the present invention is described below.

Figure 2:
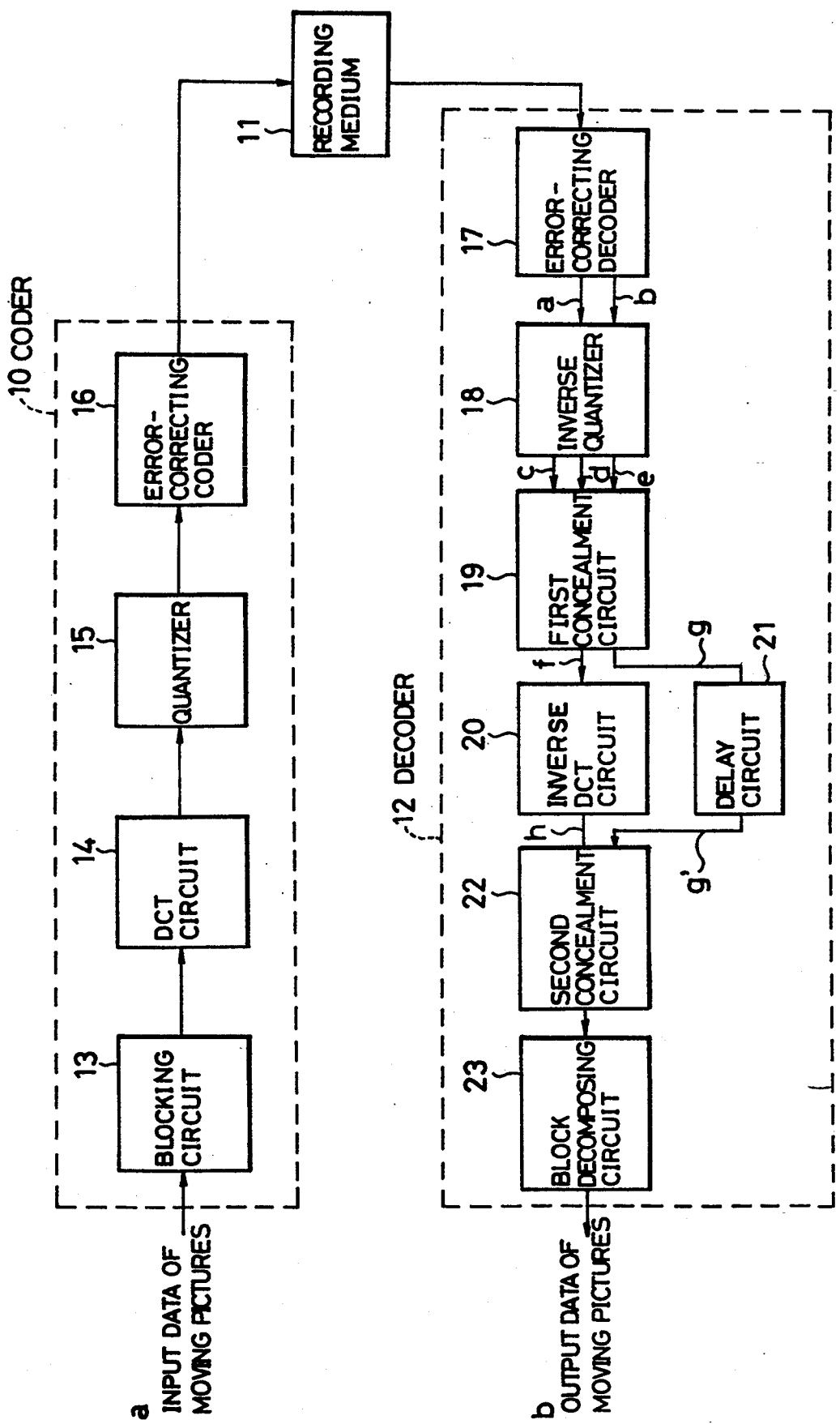
FIG. 2 is a block diagram showing an apparatus for concealing an error of a moving pictures transform coding according to an embodiment of the present invention.

FIG. 2 is a block diagram showing the apparatus for concealing an error of a moving pictures transform coding (referred to as an error concealment apparatus, hereinafter) according to this embodiment.

The error concealment apparatus shown in FIG. 2 is arranged to perform a discrete cosine transformation with respect to the input digital data about a moving pictures, quantize the resulting transform coefficient, code the quantized index and the information standing for the number of quantizing bits as error-correcting them, record the error-correcting coded data on a recording medium, read the recorded data, perform an error-correcting decoding operation about the read data, and apply the error correcting method to the error-detected piece of data when the data is decoded.

The error concealment apparatus of FIG. 2 includes a coder 10, a recording medium 11, a decoder 12 connected to the coder 10 through the recording medium 11.

The coder 10 is arranged to have a blocking circuit 13, a discrete cosine transforming (DCT) circuit 14, a quantizer 15, and an error-correcting coder 16.

The blocking circuit 13 operates to rearrange the input digital moving pictures data into the blocks, each consisting of 8-by-8 pixels.

The DCT circuit 14 is connected to the blocking circuit 18 and operates to perform the discrete cosine transformation with respect to the rearranged moving pictures, data and supply transformed 8-by-8 coefficients according to the regular rules.

The quantizer 15 is connected to the DCT circuit 14 and operates to applicably quantize the transform coefficients as referring to the additional information and supply the quantized indexes.

The error-correcting coder 16 is connected to the quantizer 15 and operates to receive the quantized indexes and perform an error-correcting coding operation with respect to the quantized indexes.

The error-correcting coded data is sent from the coder 10 to the recording medium 11 for recording the data thereon.

As shown in FIG. 2, the decoder 12 is connected to the recording medium 11.

The decoder 12 is arranged to have an error-correcting decoder 17, an inverse-quantizer 18, a first concealment circuit 19, an inverse DCT circuit 20, a delay circuit 21, a second concealment circuit 22, and a block decomposing circuit 23.

The error-correcting decoder 17 is connected to the recording medium 11 and operates to receive the data read from the recording medium 11 and perform an error-correcting decoding operation with respect to the data word by word.

The inverse-quantizer 18 is connected to the error-correcting decoder 17 and operates to separate the input data into the additional information and the quantized index, output the inverse-quantized value (DCT coefficient) obtained from the additional information and the quantized index to an output line c, set an error flag d on if an error is detected on the additional information, and set an error flag e on if an erroneous DCT coefficient is output.

The first concealment circuit 19 is connected to the inverse-quantizer 18 and operates to set an error flag g on if the erroneous DCT coefficient is input thereto and belongs to the area A having the data of the first frequency component, replace the erroneous coefficient with zero if the erroneous coefficient belongs to the area B having the data of the second frequency component, replace the erroneous component with a coefficient of the same frequency component of the horizontally adjacent block if the erroneous coefficient belongs to the area C having the data of the third frequency component, replace the erroneous coefficient with a coefficient of the same frequency coefficient of the vertically adjacent block if the erroneous coefficient belongs to the area D having the data of the fourth frequency component, and if the additional information is erroneous, perform the similar processing done if the coefficient of the area A is erroneous because the erroneous additional information means all the coefficients are made erroneous so that the excellent reproduced image can't be obtained by the error correcting method.

The inverse DCT circuit 20 is connected to the first concealment circuit 19 and operates to perform the inverse DCT operation of each data block according to the input values f output from the first concealment circuit 19 and supplies reproduced pixel values h of each block.

The delay circuit 21 is connected to the first concealment circuit 19 and operates to delay the input signal by a time lag of the output data f processed in the inverse DCT circuit 20.

The second concealment circuit 22 is connected to both the inverse DCT circuit 20 and the delay circuit 21 and operates to write reproduced pixel values on a line h into a memory if the error flag g' is set off and outputs the input values as the reproduced pixel values to the block decomposing circuit 23 or outputs the reproduced pixel values at the same location on the previous frame (screen) without using the reproduced pixel values on the line h to the block decomposing circuit 23 if the error flag is set on.

The block decomposing circuit 23 is connected to the second concealment circuit 22 and operates to output the input values from the second concealment circuit 22 in the same format as the digital moving pictures data input into the blocking circuit 13 of the coder 10.

Figure 1:
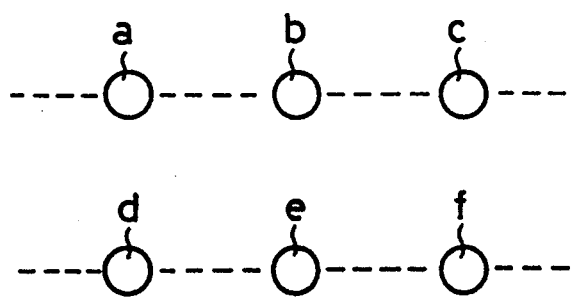
FIG. 1 is an explanatory view showing the first known method of concealing an error.
Figure 3:
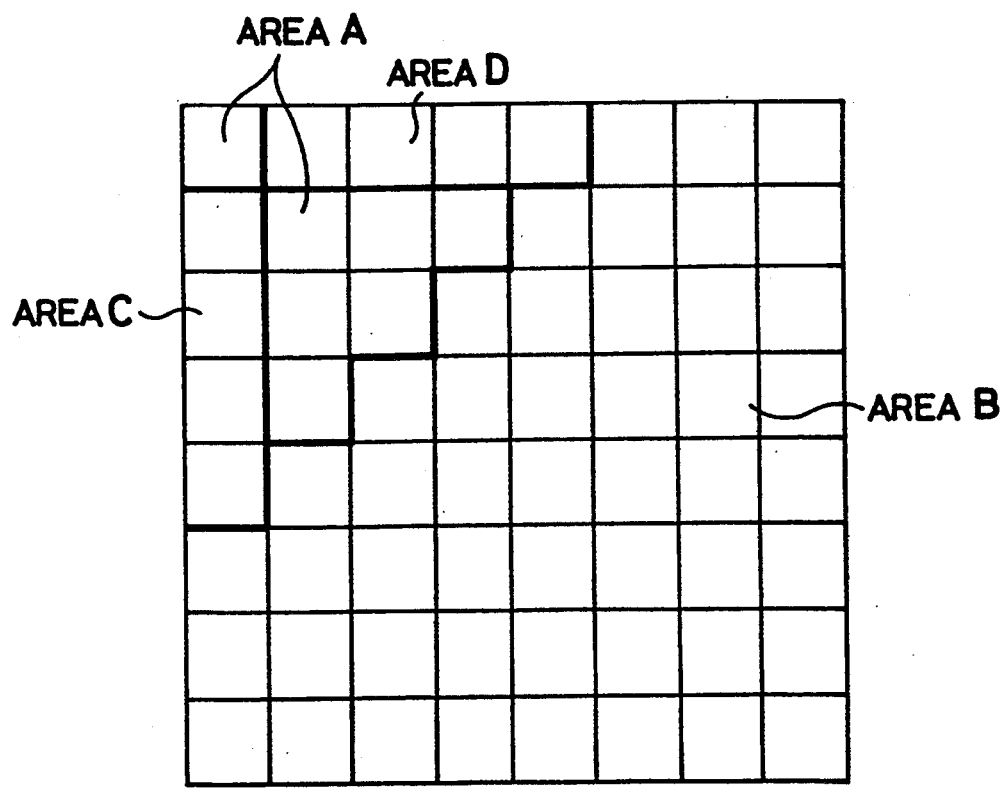
FIG. 3 is an explanatory view showing a correlation among DCT (Discrete Cosine Transformation) coefficients in the embodiment shown in FIG. 2.

The areas A to D used in the description about the first concealment circuit 19 are illustrated in FIG. 3.

In addition, the first concealment circuit 19 stores the coefficients corresponding to the frequency components of the areas C and D, because they need to replace the erroneous coefficients corresponding to the area C or D with the coefficient values of the previous adjacent block.

The inverse DCT circuit 20 is connected[to the first concealment circuit 19 and operates to perform an inverse DCT about each block according to the type of the input values f and output the reproduced pixel values h for each block.

The delay circuit 21 is connected to the first concealment circuit 19 and operates to delay the input signal by a delayed length of time of the output data is processed in the inverse DCT circuit 20.

The second concealment circuit 22 receives an error flag g' and reproduced pixel values h of each block from the inverse DCT circuit 20 and provides a memory for recording reproduced pixel values for one frame. The error flag g' is a signal formed by delaying the error flag g output from the first concealment circuit 19 in the delay circuit 21. If the error flag g' is off, the second concealment circuit 22 writes the reproduced pixel values input on a line h into a memory and outputs the input values to the block decomposing circuit 23 without processing the value. If the error flag is on, without using the reproduced pixel values from the input h, the reproduced pixel values at the same location on the previous frame is output from the memory to the block decomposing circuit 23.

The block decomposing circuit 23 is connected to the second concealment circuit 22 so that the circuit 23 may output the input values from the second concealment circuit 22 in the same format as the digital moving pictures data input to the blocking circuit 13.

FIGS. 4(A)–4(B) are a flowchart for describing the routine for inverse-quantizing one-block data in the inverse quantizer 18.

The 8-bit data is input on an input line a of the inverse quantizer 18. The input line b is set on only when the data is input from the input line a. On the output line c, the additional information and the quantized index separated from the input data are transmitted.

Figure 5:
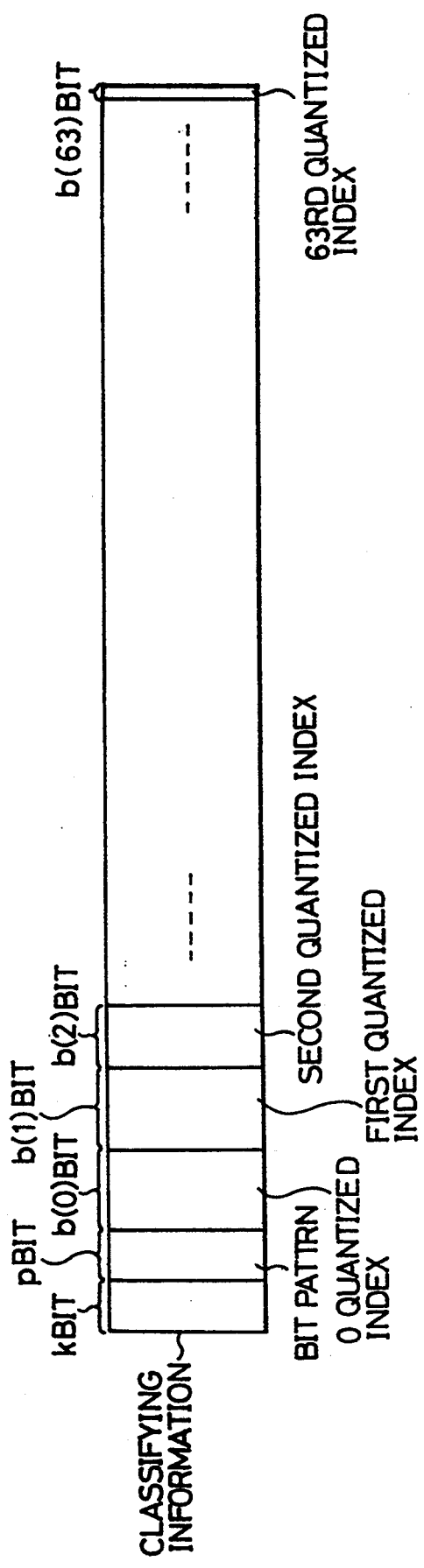
FIG. 5 is a view showing a data format to be input to the inverse quantizer shown in FIG. 2.

FIG. 5 shows the data input to the inverse quantizer 18.

The shown data is divided into several bits. In FIG. 5, k denotes the number of bits composing classifying information, p denotes the number of bits composing bit pattern information, and b(m) denotes the number of quantized bits about an m-th coefficient. The value of the quantized bits b(m) about the m-th coefficient is defined by the classifying information and the bit pattern information.

Figure 4:
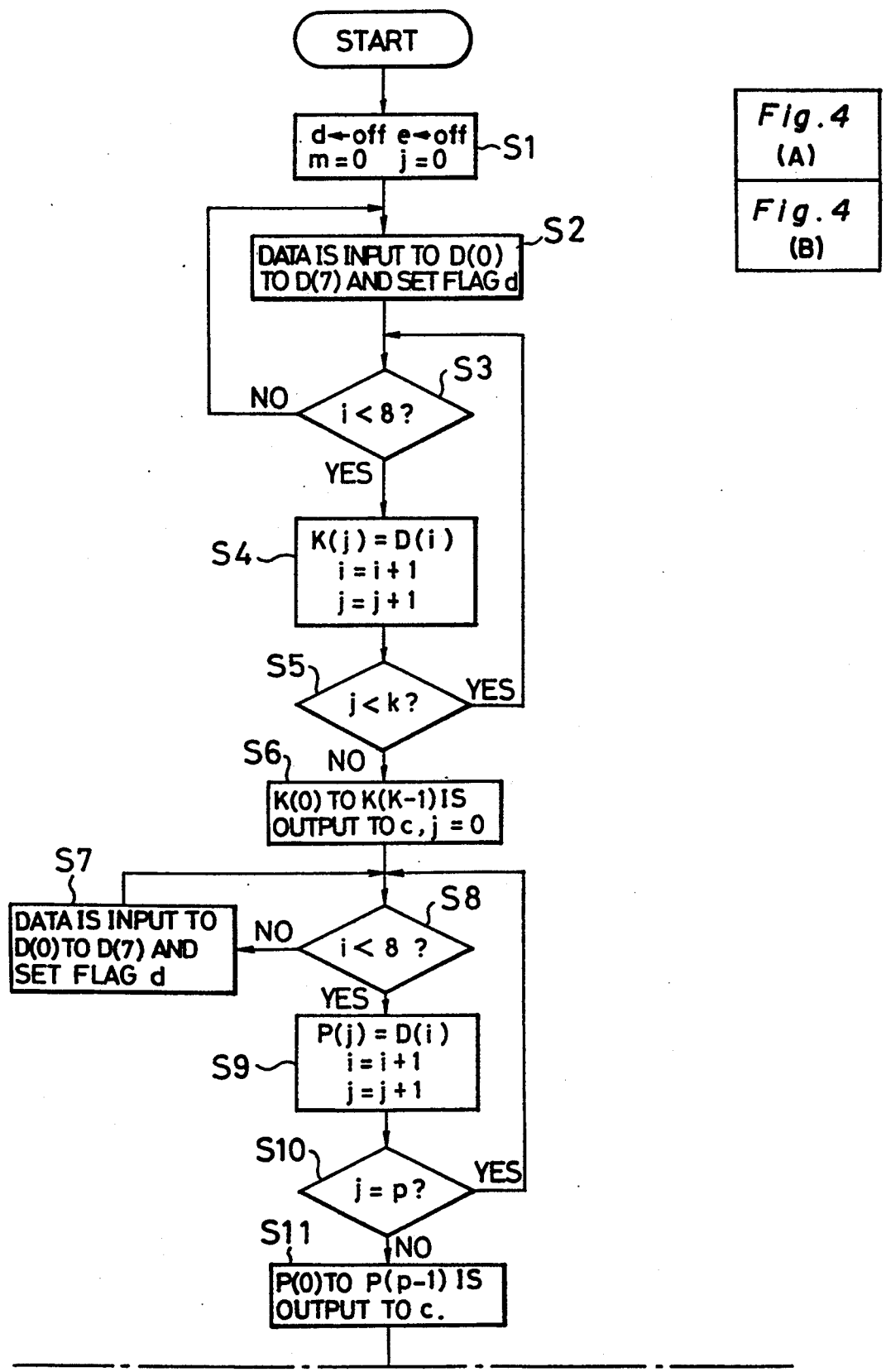
FIGS. 4(A)–4(B) are a flowchart showing an operation of an inverse quantizer shown in FIG. 2.
Figure 4:
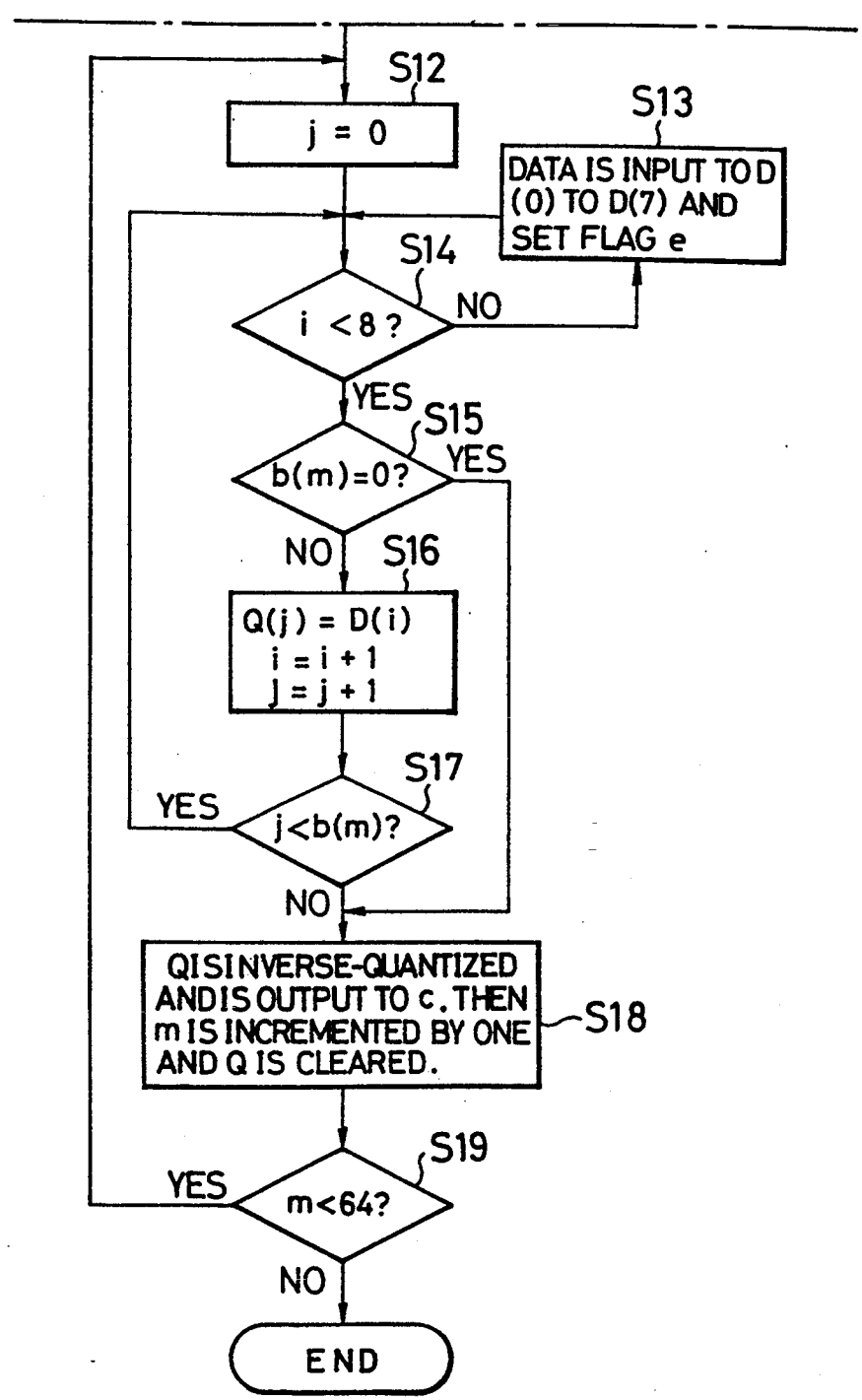

The flow of the data shown in FIG. 4 is configured to denote the 8-bit data input on the input line a as D(0) to D(7) ranged in sequence from the most significant bit (MSB), separate the input values into the additional information and the quantized index of each coefficient, and output the additional information and the inverse-quantized value of the coefficient on the output line c. Like the flow shown in FIG. 5, in FIG. 4, k denotes the number of bits composing the classifying information. p denotes the locational number of bits composing the bit pattern information. b(m) denotes the locational number of quantized bits of an m-th coefficient. m denotes the location of a bit among 64 quantized values.

At first, the output error flags d and e are set off and m and j are given to m=0 and j=0 (step S1). The 8-bit data is input from the input line a so as to set the output error flag d (step S2).

Figure 6:
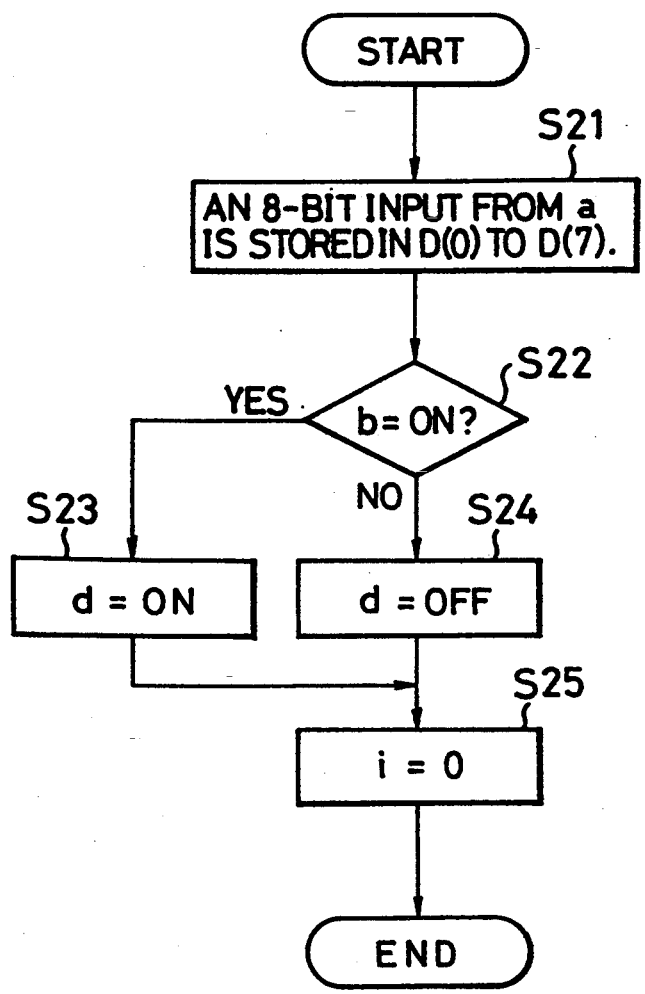
FIG. 6 is a flowchart showing operations of steps S2 and S7 shown in FIG. 4.

The detailed operation of the step S2 will be illustrated in FIG. 6.

Next, the input data obtained at the step S2 is separated into the classifying information and the bit pattern information, which are input to K and P, respectively. K and P are represented by the following expressions.

$$K = 2\char`\^(k-1)*K(0) + 2\char`\^(k-2)*K(1) + \ldots$$
$$+ 2\char`\^0*K(k-1)$$

$$P + 2\char`\^(p-1)*P(0) + 2\char`\^(p-2)*P(1) + \ldots$$
$$+ 2\char`\^0*P(p-1)$$

where 2 ^ denotes a power law of 2 and * denotes a normal multiplication.

If more bits than 8 are necessary (steps S3 and S8), at the steps S2 and S7 (to be described later), the information is obtained every 8 bits from the input line a so as to set the error flag d on or off. In succession, the input data is stored in K one bit by one bit (step S4). If j<k becomes negative, the input of k-bit classifying information is terminated (step S5). K is output to c (step S6). The operation at the step S7 is similar to that at the step S2.

The input bit is stored in P one bit by one bit (step S9). If j<p becomes negative, the input of p-bit pattern information is terminated (step S10) and P is output to c (step S11). At this time, the additional information is obtained. It indicates the number of bits used for quantizing coefficients.

Next, 64 quantized indexes are sequentially read and stored in Q. At steps S12 to S18, one coefficient is processed. If b(m)=0 becomes affirmative, that is, if the coefficient is quantized by 0 bit (step S15) or j<b(m) becomes negative, the input of the m-th quantized value is terminated (step S17).

Then, Q is inverse-quantized and is output onto the output line c, then incrementing m and clearing Q (step S18). When m<64 becomes negative, the output of 64 inverse-quantized values for one block is terminated (step S19). The data input is sequentially carried out from the step S13.

Figure 7:
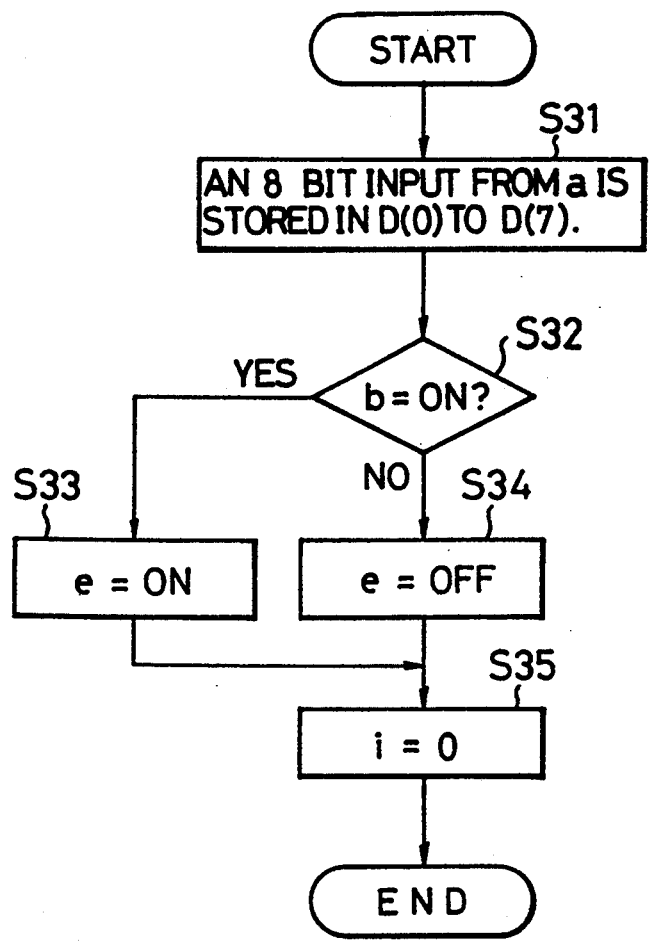
FIG. 7 is a flowchart showing an operation of a step S13 shown in FIG. 4.

The detailed operation of the step S13 will be shown in the flowchart of FIG. 7.

The operations of the steps S2 and S7 shown in FIG. 4(A) are illustrated in the flowchart of FIG. 6.

The 8-bit data is input from the input line a. The error flag b is set on only when the data input from the input line a includes one or more error bits.

The 8-bit data decoded in an error-correcting manner is input from the input line a so that the 8-bit data may be denoted by D(0) to D(7) ranged in sequence from the MSB (step S21). If the input data contains an error bit, the input error flag b is set on (step S22). If so, the output error flag d is set on (step S23). If not, the output error flag d is set off (step S24). And, i becomes zero (0) (step S25) where i denotes the bit number of D.

The operation of the step S13 shown in FIG. 4(B) will be illustrated in the flowchart of FIG. 7.

Like the flow of FIG. 6, the data is input from the input line a every 8 bits. The error flag b is set on only when the data input from the input line a contains one or more error bits.

The 8-bit data decoded in an error-correcting manner is input from the input line a and is denoted as D(0) to D(7) ranged in sequence from the MSB (step S31). If the input data contains one or more error bits, the input error flag b is set on (step S32). If so, the output error flag e is set on (step S33). If not, the output error flag e is set off (step S34), and i becomes: zero (0) where i denotes a bit number of D.

Figure 8:
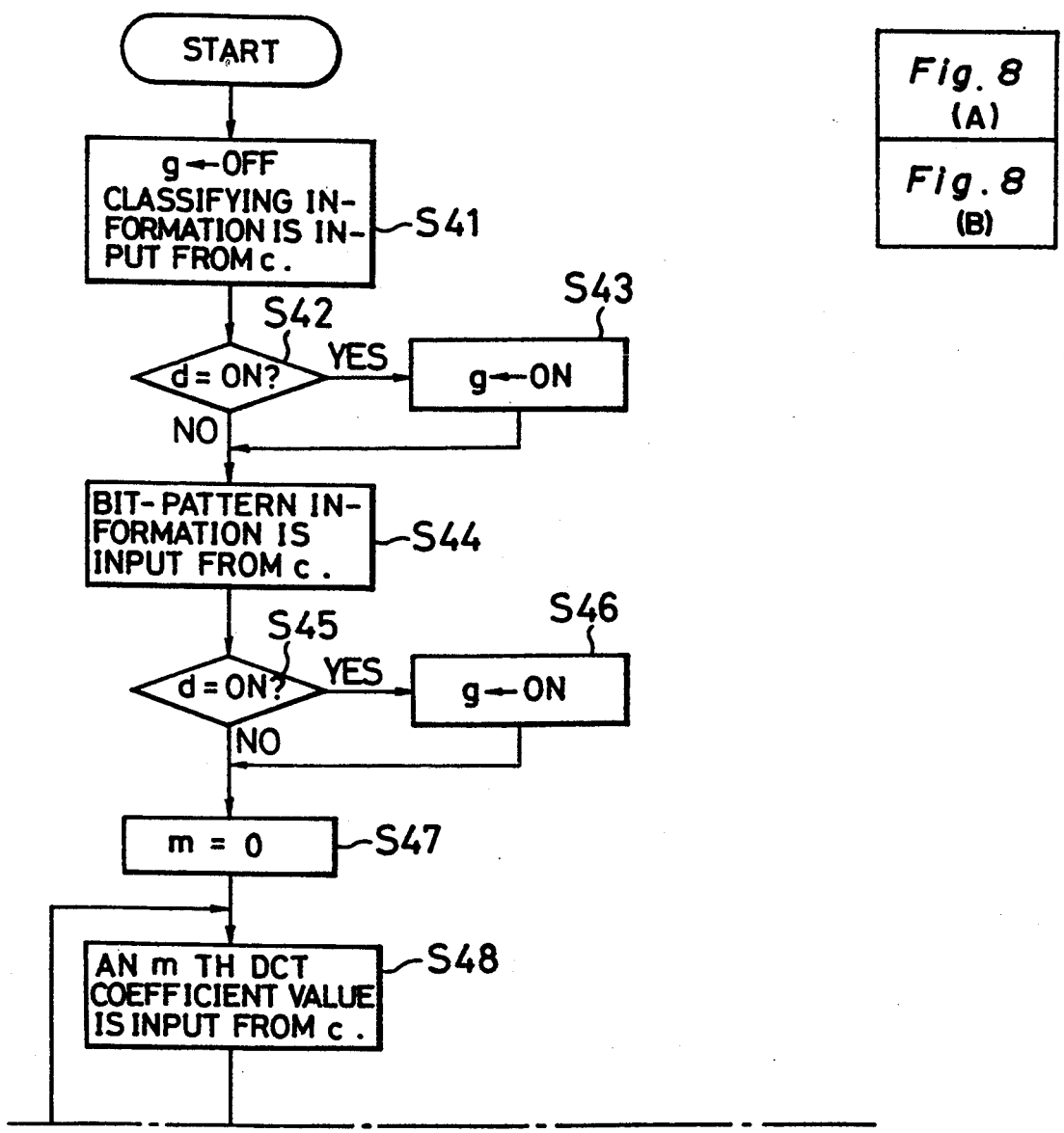
FIGS. 8(A)–8(B) are a flowchart showing an operation of a first concealment circuit shown in FIG. 2.
Figure 8:
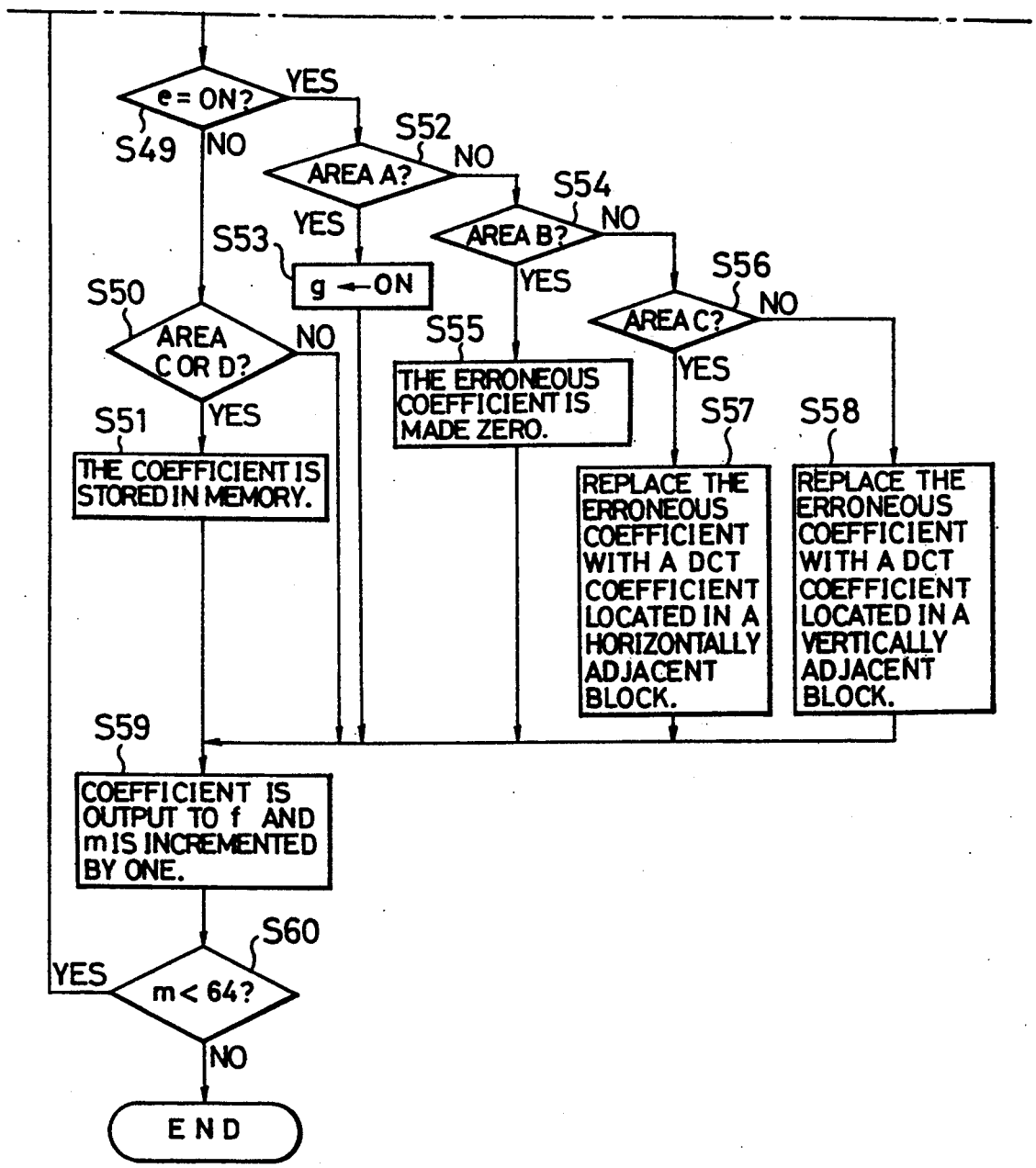

FIGS. 8(A)–8(B) are a flowchart showing an operation of the first concealment circuit 19 for concealing the DCT coefficient value for one block.

At first, the output error flag g is set off so that the classifying information may be input from the output line c (step S41). Next, the state of the input error flag d is determined. If the error flag d is set on, it indicates that the input classifying information contains an error (step S42). Hence, the error flag g is set on (step S43).

In succession, the bit pattern information is input from the output line c (step S44), and the state of the error flag d is determined (step S45). If the error flag d is set on, it indicates that the input bit pattern information contains an error. Hence, the error flag g is set on (step s46). At the steps S41 to S46, if the additional information contains an error, the error flag g is kept on.

Next, m is made zero (0) where m denotes a number of the DCT coefficient to be treated (step S47). Until m reaches 64, the operation from the steps S48 to S60 is repeated.

At first, an m-th DCT coefficient is input from the output line c (step S48) and the state of the input error flag e is determined (step S49). If the error flag e is set off, it indicates that the input coefficient is correct. If the error flag e is set off and the coefficient belongs to the C or D area, the input coefficient is stored in memory so that the coefficient may be replaced if an error takes place in future. If the coefficient belongs to the A or B area, it is not stored in memory because it is not replaced. At the step S49, if the error flag e is set on, it indicates that the input coefficient is not correct. It is determined which area the input coefficient belongs to. If the coefficient belongs to the area A, the error flag g is set on (step S53). If the coefficient belongs to the area B, the coefficient is made zero (step S55). If the coefficient belongs to the area C, the coefficient is replaced with the coefficient of the same frequency component of the horizontally adjacent block (step S57). If the coefficient belongs to the area D, the coefficient is replaced with the coefficient of the same frequency component of the vertically adjacent block (step S58).

Next, the concealment coefficient is output onto the output line f and m is incremented (step S59). When m reaches 64, that is, all the coefficients in one block are modified, the operation exits out of the loop (step S60).

Figure 9:
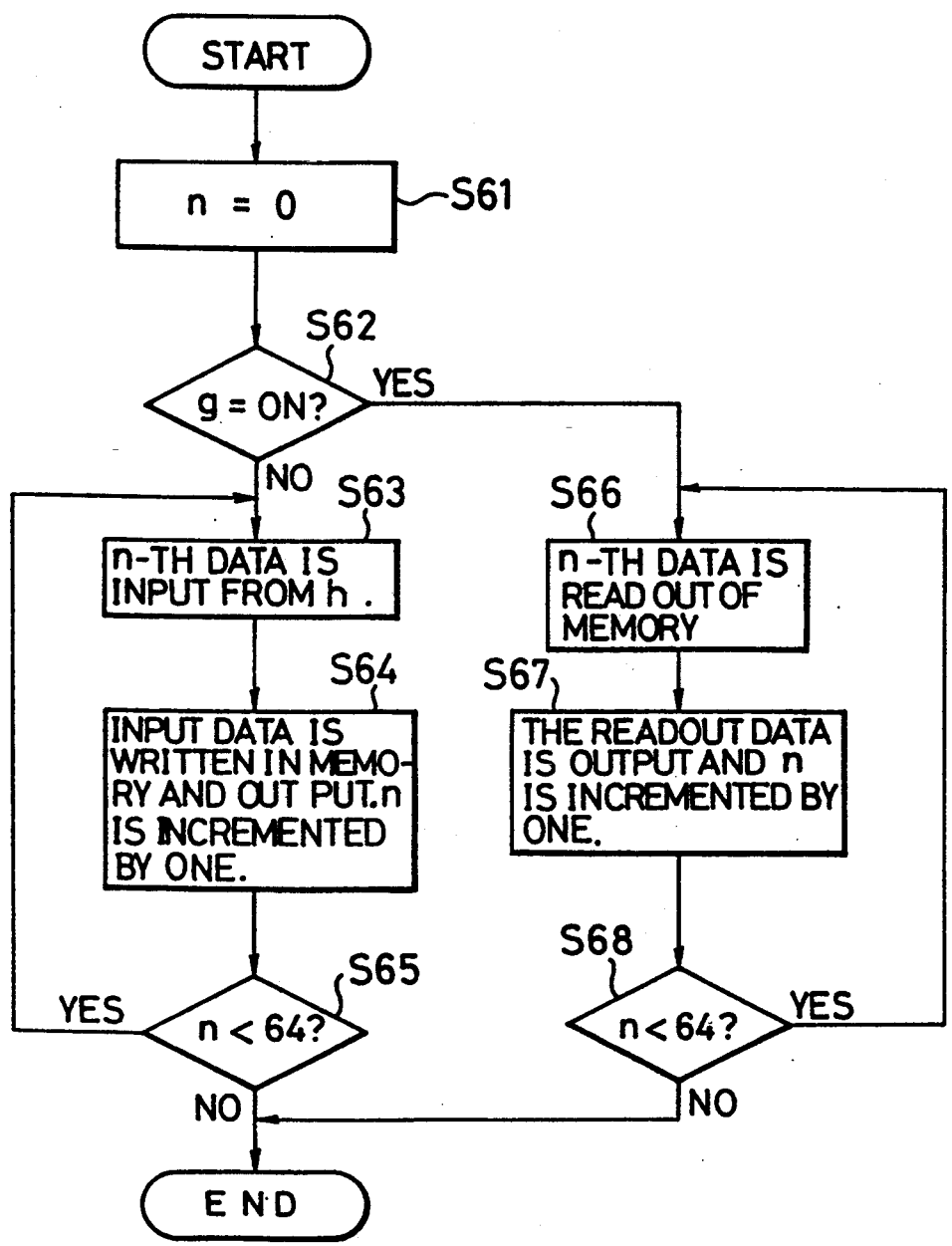
FIG. 9 is a flowchart showing an operation of a second concealment circuit shown in FIG. 2.

FIG. 9 is a flowchart showing an operation of the second concealment circuit 22 for concealing reproduced pixel values of one block.

Each reproduced pixel values in one block is input from the output line h. g' denotes whether or not the pixel of the block is replaced with the reproduced pixel of the previous frame.

At first, n is made zero (0) where n denotes a number of a pixel to be treated (step S61). Next, the state of the flag g' is checked (step S62). If the flag g' is set off, that is, the coefficient contained in the A area or the additional information has no error, the input reproduced pixel values are output without being processed. Hence, the operations of steps S68 to 65 (to be described later) are repeated.

The n-th data is input from the input line h (step S63). The input data is stored in memory and output to the block decomposing circuit 23. Then, n is incremented (step S64). When n reaches 64, that is, all the data of one block is processed, the operation exists out of the loop (step S65).

At the step S62, if the flag g' is set on, that is, the coefficient contained in the A area or the additional information has an error, the operations of steps S66 to S68 (to be described later) are repeated for reading the reproduced pixel values at the same location of the previous frame stored in memory.

At first, the n-th data of the previous frame is read from the memory (step S66). Then, the read data is output to the block decomposing circuit 23 and n is incremented (step S67). When n reaches 64, that is, all the data for one block is processed, the operation exits out of the loop (step S68).

Figure 10:
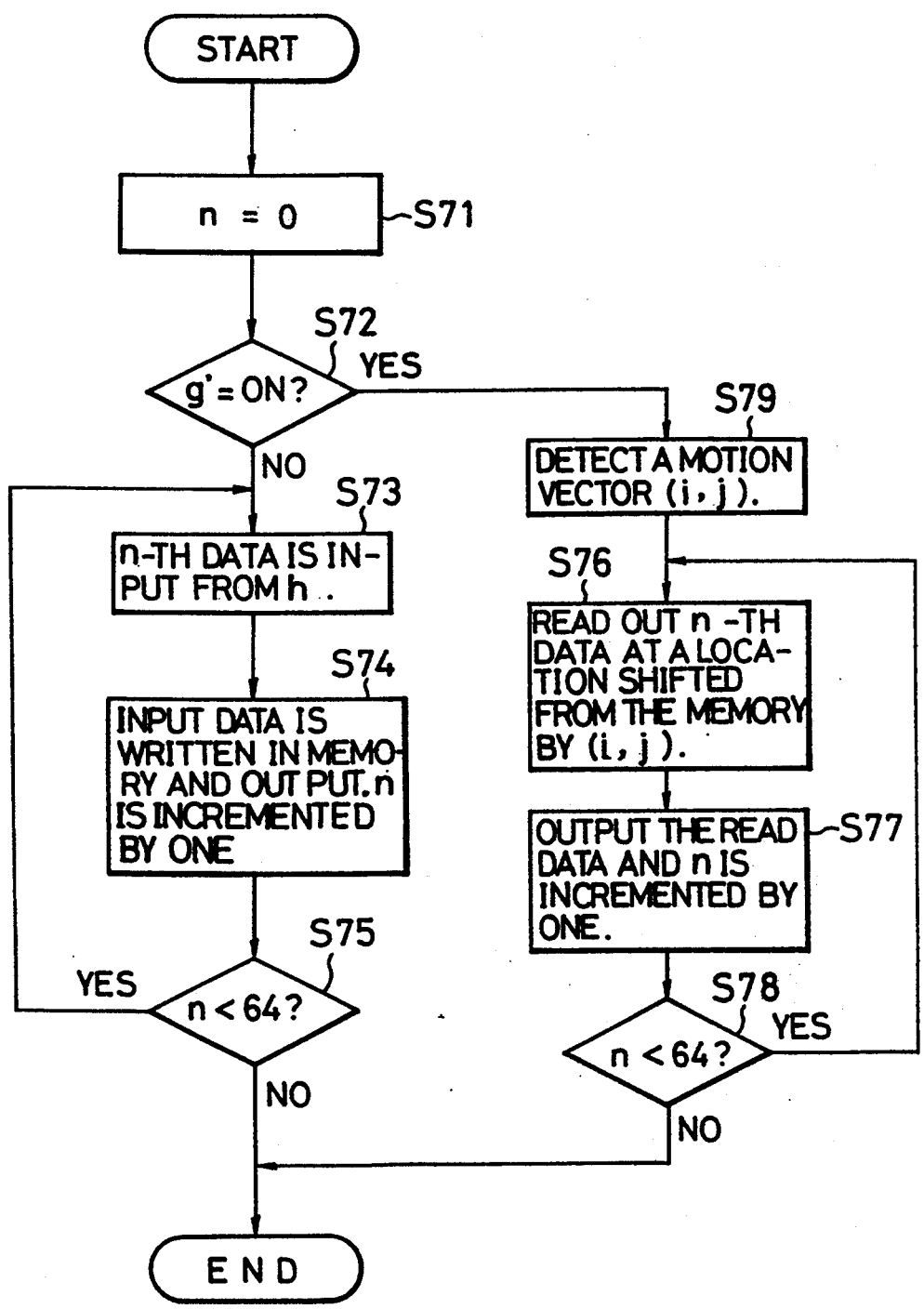
FIG. 10 is a flowchart showing an operation of the second concealment circuit provided with a motion-detecting function.

FIG. 10 is a flowchart showing an operation of another embodiment of the second concealment circuit 22 for providing an excellent reproduced image by detecting the motion of an image when concealing all the reproduced pixel values included in one block.

Like the flow of FIG. 9, each reproduced pixel values included in the block is input from the output line h. g' denotes a flag indicating whether or not the pixel values of the block is to be replaced with the reproduced pixel values of the previous frame.

The steps S71 to S75 of FIG. 10 are identical to the steps S61 to S65 of FIG. 9. If the flag g' is set on, that is, the coefficient belonging to the area A or the additional information has an error (step S72), the motion is detected from the previous reproduced block and the motion vector is assumed as (i, j) (step S79). Next, to read the reproduced pixel values of the previous frame stored in memory, the steps S76 to S78 are repeated.

At first, there is the data read from the memory at the location shifted from the n-th data of the previous frame by the motion vector (i, j) (step S76). Then, the read data is output to the block decomposing circuit 23 and n is incremented (step S77). At the step 76, if the n-th data is stored at an address (k, l) of the memory, the data of the address (k+i, l+j) is read out of the memory. When n reaches 64, that is, all the data of one block is processed, the operation exists out of the loop (steps S78).

Figure 11:
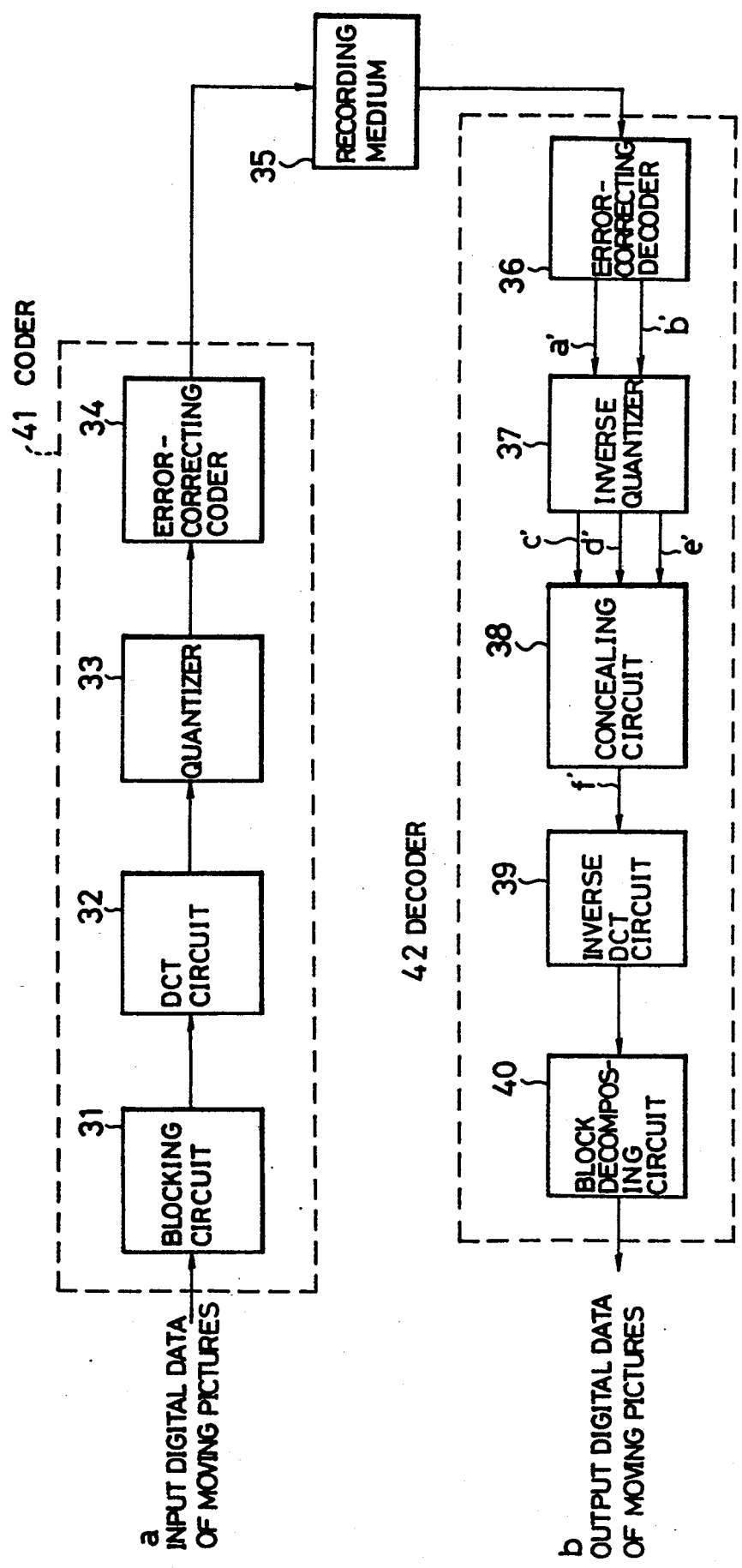
FIG. 11 is a block diagram showing an apparatus for concealing an error of a moving pictures transform coding according to a second embodiment of the invention.

FIG. 11 is a block diagram showing an apparatus for concealing an error of a moving pictures transform coding according to another embodiment of the present invention.

The difference between the apparatus shown in FIG. 11 and the apparatus shown in FIG. 2 resides in a method for concealing an error.

The apparatus shown in FIG. 2 is arranged to select one of the two cases according to the error-occurring coefficient, one case for concealing an error-occurring DCT coefficient by using the first concealment circuit 19 and the other case for concealing each pixel values of the error-occurring block with the corresponding pixel values of the previous frame by using the second concealment circuit 22.

The apparatus shown in FIG. 11 is arranged to conceal all the error-occurring DCT coefficients.

In FIG. 11, the blocking circuit 31 to the inverse quantizer 37 ranged along the data flow are equivalent to the blocking circuit 13 to the inverse quantizer 18 shown in FIG. 2 ranged along the data flow.

An inverse DCT circuit 39 shown in FIG. 11 is the same as the inverse DCT circuit 20 shown in FIG. 2 and the block decomposing circuit 40 shown in FIG. 11 is the same as the block decomposing circuit 23 shown in FIG. 2.

In FIG. 11, the blocking circuit 31 to the error correcting coder 34 compose a coder 41 and the error correcting decoder 36 to the block decomposing circuit 40 compose a decoder 42.

Later, the difference of this arrangement from that shown in FIG. 2, that is, the operation of the concealment circuit 38 will be discussed in detail.

Like the first concealment circuit 19 shown in FIG. 2, the input sixty-four (64) coefficients are divided into the areas A to D as shown in FIG. 3 to which each proper concealing method applies.

The data to be input is the same as that of the first concealment circuit 19 shown in FIG. 2. That is, from a line c', the additional information and the DCT coefficient value are input. d' denotes an error flag to be set on if the additional information input from the line c' has an error. e' denotes an error flag to be set on if the DCT coefficient input from the line c' has an error.

In addition, the concealment circuit 38 stores the DCT coefficients in the areas A, C and D in its memory in order to use them for modification.

At first, if an error takes place in the coefficient belonging to the area A, that is, the data of the fifth frequency component, the error-occurring coefficient is replaced with the coefficient of the same frequency component in the block resting at the same location of the previous frame. If an error takes place in the coefficient of the sixth frequency component belonging to the area B, the coefficient of the seventh frequency component belonging to the area C and the coefficient of the eighth frequency component belonging to the area D, the concealment circuit 38 operates in the similar manner to the first concealment circuit 19 shown in FIG. 2. That is, if an error takes place in the coefficient belonging to the area B, the error-occurring coefficient is made zero. If an error takes place in the coefficient belonging to the area C, the error-occurring coefficient is replaced with the coefficient of the same frequency component of the horizontally adjacent block. If an error takes place in the coefficient belonging to the area D, the error-occurring coefficient is replaced with the coefficient of the same frequency component in the vertically adjacent block. If an error takes place in the additional information, it is regarded that all the pixels are made erroneous. Hence, the foregoing processing is carried out with respect to all the coefficients.

Figure 12:
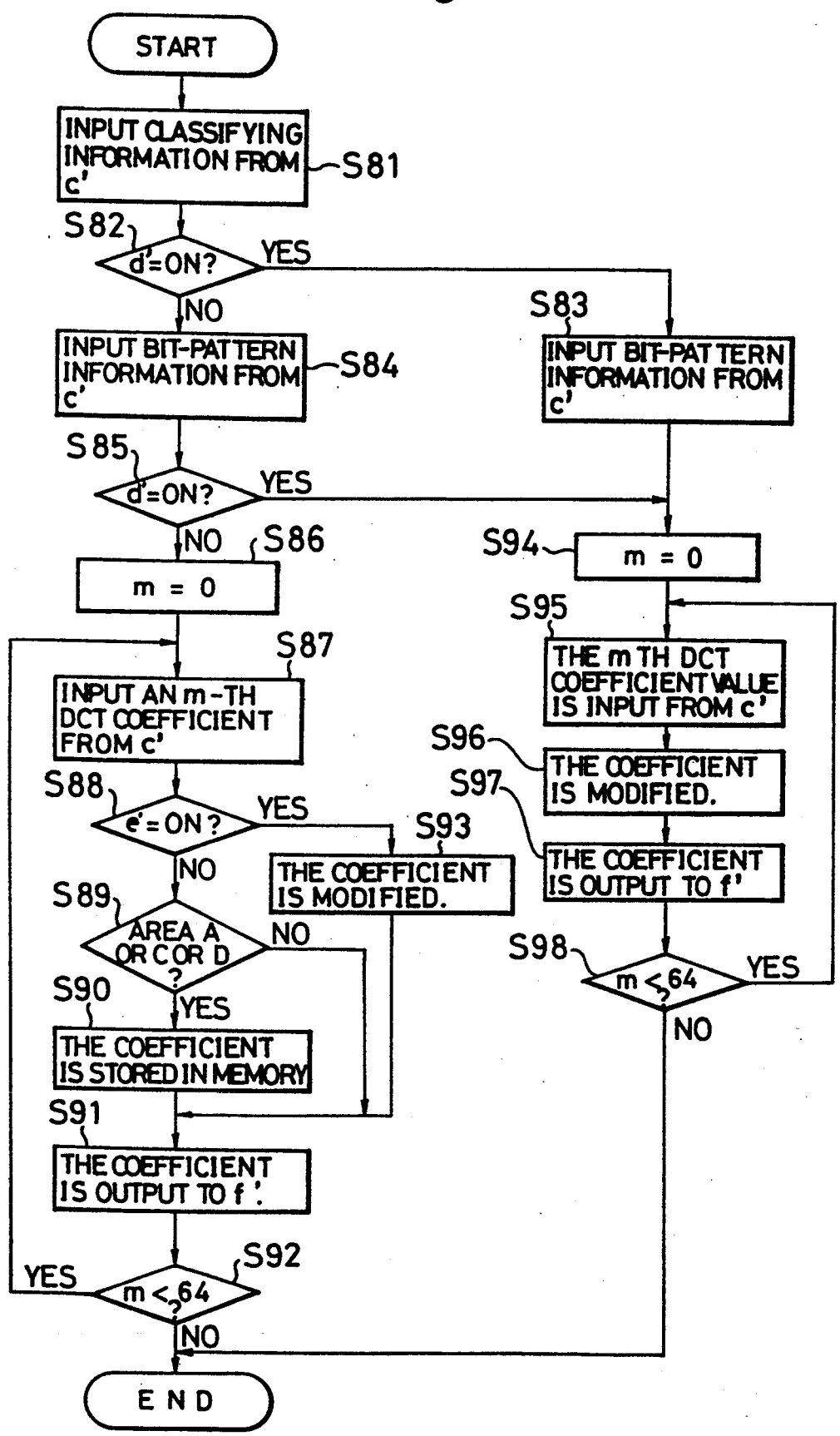
FIG. 12 is a flowchart showing an operation of the concealment apparatus shown in FIG. 11.

FIG. 12 is a flowchart showing an operation of processing one-block data by using the concealment circuit 38.

From the line c' the additional information and 64 DCT coefficients are input. d' is an error flag indicating whether or not the additional information to be input is erroneous. e' denotes an error flag indicating whether or not the DCT coefficient is erroneous. The concealed DCT coefficient is output from the line f'.

At first, the classifying information is input from the line c' (step S81). Then, the state of the input error flag d' is determined (step S82). If d' is set on, that is, the input classifying information is erroneous, the operation is branched to a step 83 in which the bit pattern information is input from the line c'. If d' is set off, the bit pattern information is input from the line c' (step S84) and the; state of d' is determined (step S85). If d' is set on, it indicates that the input bit pattern information is erroneous. Hence, the operation is branched into a step S94.

If the additional information is not erroneous, the operations at the steps S86 to S92 are executed. If it is erroneous, the operations at the steps S94 to S98 are executed.

If the additional information is not erroneous, m is made zero (0), where m denotes a locational number of the DCT coefficient (step S86). Until m reaches 64, the operations at the steps S87 to S92 are repeated with respect to each coefficient.

At first, the m-th DCT coefficient is input from the line c' (step S87). Then, the state of the input error flag e' is determined (step S88). If e' is set on, it indicates that the input coefficient is erroneous. Hence, the erroneous coefficient is concealed (step S93).

Figure 13:
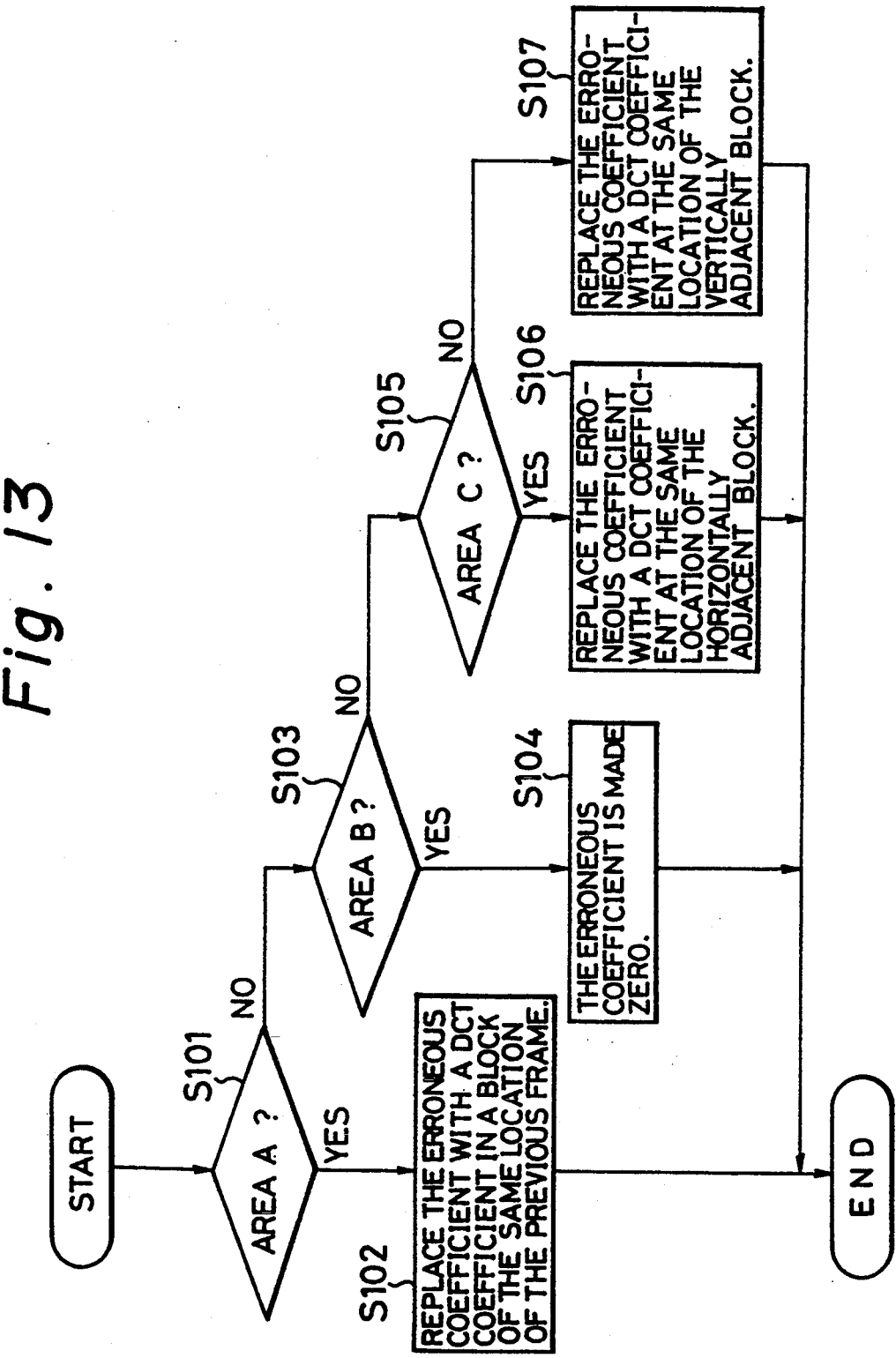
FIG. 13 is a flowchart showing operations of steps S93 and S96 shown in FIG. 12.

FIG. 13 is a flowchart showing the detailed operation of the step S93.

If the input error flag e' is set off, that is, the input DCT coefficient is not erroneous, it is determined which area the coefficient is located (step S89). If it belongs to the areas A, C or D, the coefficient is stored in memory (step S90). If not, the operation jumps to a step S91 at which the input concealed coefficient is output to the line f' (step S91). And, until m<64 becomes negative, the operations at the steps S87 to S91 are repeated (S92). If the determined result at the step S92 becomes negative, the operation exists out of the loop.

If the additional information is erroneous, m is made zero (0), where m denotes a locational number of the DCT coefficient to be processed (step S94). Until m reaches 64, the operations at the steps S95 to S98 are repeated with respect to each coefficient.

At first, the m-th DCT coefficient is input from the line c' (step S95). Then, the coefficient is concealed(step S96).

The operation goes to the steps S94 to S98 only if the additional information is found to have an error. If so, all the DCT coefficients are erroneous. Hence, all the DCT coefficients input at the step S95 are concealed at the step S96. The operation of the step S96 is the same as that of the step S93.

Then, the concealed coefficient is output to the line f' (step S97). Then, until m<64 becomes negative, the operations of the steps S95 to S97 are repeated (step S98). If the determined result at the step S98 becomes negative, the operation exits out of the loop.

The flowchart of FIG. 13 illustrates the detailed operation of the steps S93 and S96 of FIG. 12.

In this operation, an error-occurring DCT coefficient is entered and the coefficient is applicably processed according to the area to which the coefficient belongs.

At first, it is determined whether or not the input coefficient belongs to the area A (step S101). If yes, the erroneous coefficient is replaced with the DCT coefficient at the same location of the previous frame (step S102). If no, it is determined whether or not the input coefficient belongs to the area B (step S103). If yes, the erroneous coefficient is made zero (0) (step S104). If no, it is determined whether or not the input coefficient belongs to the area C (step S105). If yes, the erroneous coefficient is replaced with the coefficient of the same frequency component at the horizontally adjacent block (step S106). If no, it means that the input coefficient belongs to the area D. Hence, it is replaced with the coefficient of the same frequency component at the vertically adjacent block (step S107).

As described above, the error concealment apparatus according to the present invention is arranged to divide one frame or one field into some blocks, perform a transformation about each block for efficiently coding the block into a code train.

The transformation is not limited to the discrete cosine transformation done in this embodiment, but may be any transformation such as a KL transformation or a wavelet transformation.

The quantizing method used in the above embodiment is merely an example. In actual, any quantization may be employed.

According to this invention, if an error takes place in the fetched data, the concealing method is selected according to the type of the transform coefficient. Hereafter, as an example, the description will be directed to a way of how the DCT (discrete cosine transformation) is performed for coding a block consisting of 8 by 8 pixels.

Figure 14:
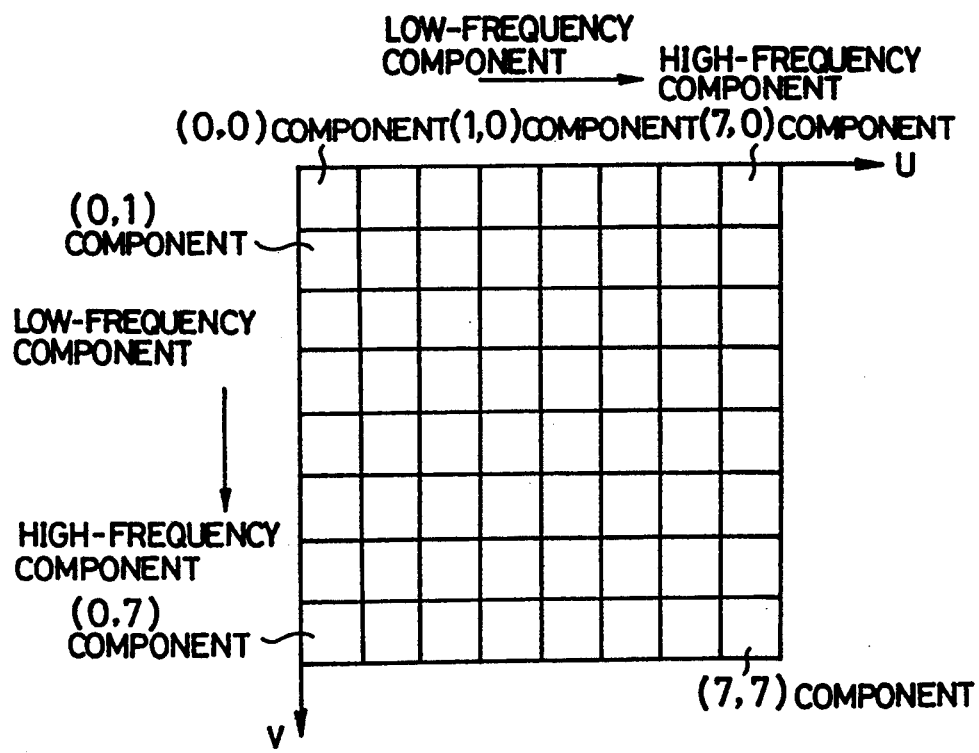
FIG. 14 is an explanatory view showing frequency components of 8-by-8 DCT coefficients used in the concealment apparatus shown in FIG. 11.

When the DCT is performed with respect to the 8-by-8 pixel block, as shown in FIG. 14, the resulting transform coefficients are 64, each of which stands for a spatial frequency component of each pixel included in the block.

As shown in FIG. 14, assuming that an u-axis extends horizontally and a v-axis extends vertically, the values of $u=0$ and $v=0$ stand for a d.c. component.

A value of $u=1$ stands for the horizontally lowest frequency component and as a value of u goes higher, it stands for a horizontally higher frequency component. When a value of u reaches 7, that is, $u=7$, it stands for the highest frequency component. A value of $v=1$ stands for the vertically lowest frequency component and as a value of v goes higher, it stands for a vertically higher frequency component. When a value of v reaches 7, that is, $v=7$, it stands for the vertically highest frequency component.

At first, assume that the d.c. component or the low frequency component is made erroneous.

Figure 15:
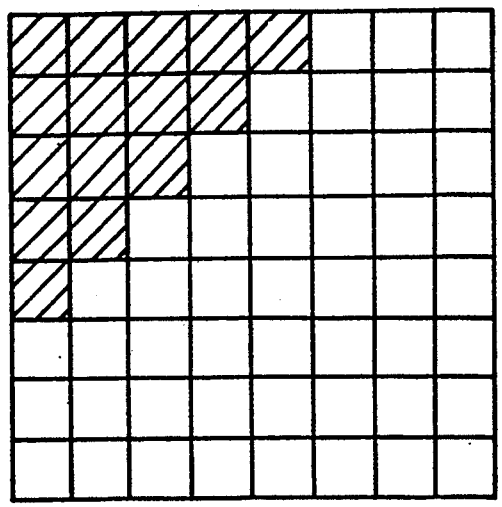
FIG. 15 is an explanatory view showing DCT coefficients contain high correlation shown in FIG. 14.

In FIG. 15, a part indicated by oblique lines indicate the locations of the d.c. components and the low frequency components on the 8-by-8 matrix.

The d.c. components and the low frequency components have relatively large values from a statistical point of view. A frequency component on one block has a large correlation with the same frequency component on the adjacent block. Normally, when the prediction is performed by using the correlation, a disadvantage may take place as discussed in "Technical Bulletin of Television Engineers of Japan", Vol. 12, No. 10, pp. 19–24, February 1988. This disadvantage is overcome by this invention.

When treating the moving pictures data, the temporal correlation is made very large. In a case that a reproduced image at the same location of the previous frame is used as a predicative value, the excellent reproduced image for only one block can be obtained. That is, if an error takes place in the d.c. component or the low frequency component, after decoding the image, the reproduced image is replace,d with that at the same location of the previous frame for overcoming the foregoing disadvantage. As another means, it is possible to sense the motion of an image in the light of the adjacent blocks and replace the reproduced image with that of the previous frame shifted by the sensed motion vector. In place of replacing the overall one block, before performing the inverse DCT, only the error-occurring coefficient is replaced with the DCT coefficient of the block at the same location of the previous frame for obtaining an excellent reproduced image.

Figure 16:
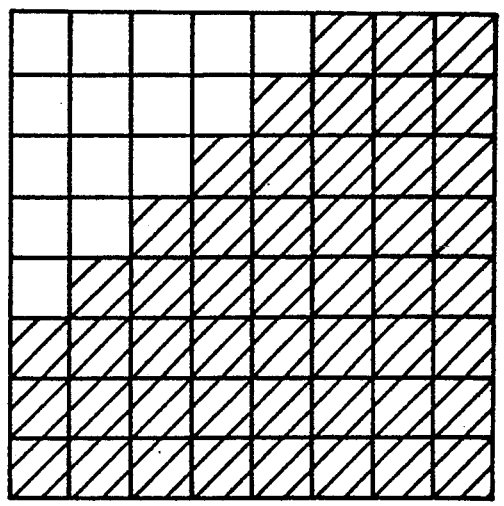
FIG. 16 is an explanatory view showing DCT coefficients contain low correlation shown in FIG. 14.

Next, consider that an error takes place in the high frequency component. The part indicated by the oblique lines shown in FIG. 16 indicates the locations of the high frequency components on the 8-by-8 matrix.

The high frequency components have so low a correlation in the light of space and time that the prediction is disallowed.

Figure 17:
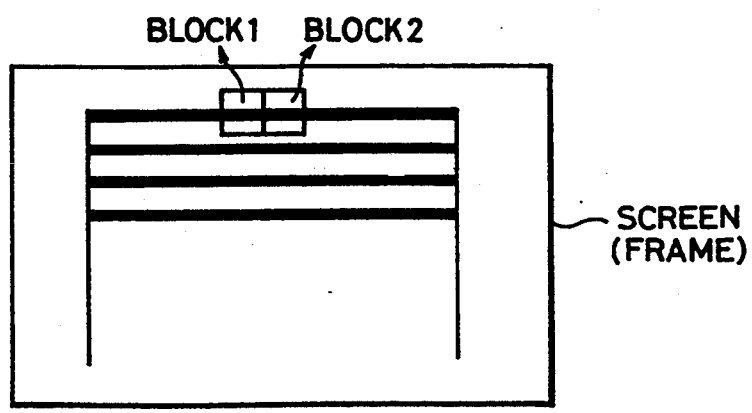
FIG. 17 is an explanatory view showing an image having horizontally serial edges.

However, from a statistical point of view, the value is so small as compared to the low frequency component. If an error takes place, only the fine change of an image takes place, so that the error may not have a visually substantial influence on the image. For example, when a high frequency component has a value of 0, no fine change of the image takes place. Hence, the image looks like being slightly blurred. In actual, however, no substantial change of the image takes place. If an error takes place in the high frequency component, therefore, the coefficient is replaced with 0. Further, the image data often has continuous edges. For example, as shown in FIG. 17, in the case of performing an orthogonal transformation with respect to the image data having horizontally continuous edges, like the blocks 1 and 2 shown in FIG. 17, the vertical frequency components among the transform coefficients of the horizontally adjacent blocks such as the blocks 1 and 2 shown in FIG. 17 have a large correlation between them.

Figure 18:
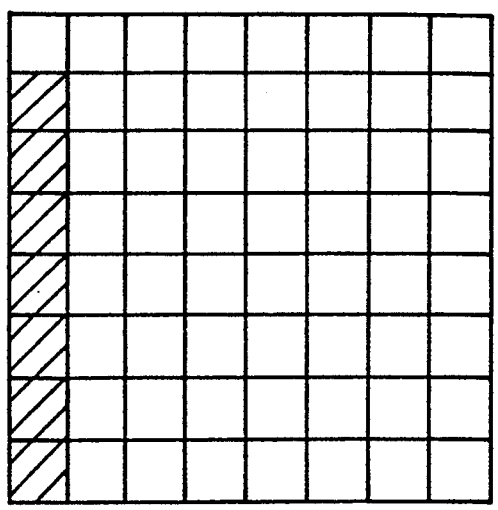
FIG. 18 is an explanatory view showing a correlation among DCT coefficients used in the concealment apparatus shown in FIG. 11.

A part indicated by the oblique lines of FIG. 18 shows the location of a coefficient having a large correlation with the transform coefficient of the horizontally adjacent block on the 8-by-8 matrix.

Figure 19:
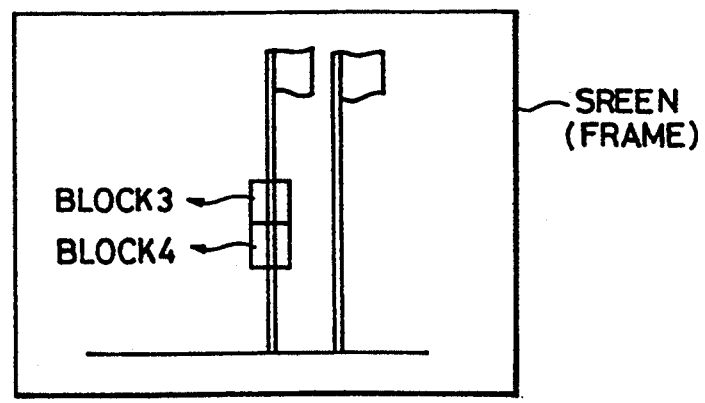
FIG. 19 is an explanatory view showing an image having vertically serial edges.

In the image data having vertically continuous edges as shown in FIG. 19, the horizontal frequency components among the transform coefficients of the vertically adjacent blocks such as blocks 3 and 4 shown in FIG. 19 have a large correlation among them.

Figure 20:
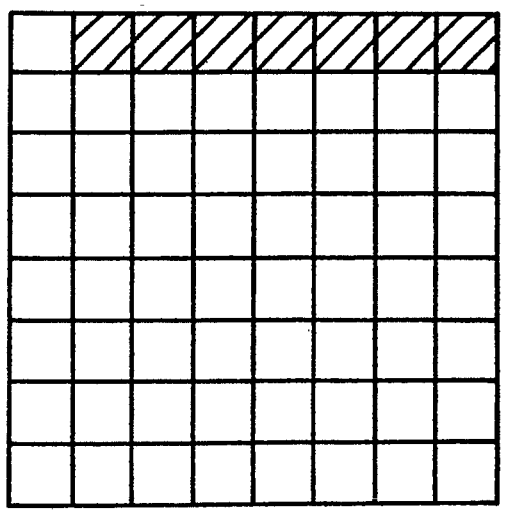
FIG. 20 is an explanatory view showing a correlation among DCT coefficients used in the concealment apparatus shown in FIG. 11.

A part indicated by oblique lines of FIG. 20 shows the locations of the coefficients having a large correlation with the transform coefficients of the vertically adjacent blocks on the 8-by-8 matrix.

To process such coefficients as having a large correlation between the adjacent blocks, it is effective to replace an erroneous coefficient with the coefficient at the same location of the adjacent block. As such, assuming that an area A denotes an area for d.c. components and low-frequency components, an area B denotes an area for only high-frequency components, and an area C denotes an area for such coefficients as having a large correlation with the corresponding ones in the horizontally adjacent block, and an area D denotes an area for such coefficients as having a large correlation with the corresponding ones in the vertically adjacent block, if an error takes place in the coefficient belonging to the area A, after the inverse DCT is performed, the reproduced pixel values in the error-occurring block is replaced with the corresponding pixel values at the same block or the pixel values shifted by the motion vector obtained by detecting the motion of a picture on the reproduced screen without modifying the erroneous pixel by correcting the frequency component. In place, the erroneous coefficient may be replaced with the DCT coefficient at the same location of the previous frame. If an error takes place in the coefficient belonging to the area B, the erroneous coefficient is made zero. If an error takes place in the coefficient belonging to the area C, the erroneous coefficient value is replaced with the coefficient of the same frequency component at the horizontally adjacent block. If an error takes place in the coefficient belonging to the area D, the erroneous coefficient is replaced with the coefficient of the same frequency at the vertically adjacent block.

Those areas on the 8-by-8 matrix are illustrated in FIG. 3, for example. As such, by selecting the concealing method according to the frequency component of an erroneous coefficient, it is possible to obtain a more excellent reproduced image than the known concealment system.

Those grouped areas are merely examples. The most approximate area grouping depends on the type of input data and whether or not the data is sub-sampled and the data is stored in an interlaced manner.

According to the present invention, if an error is detected in the fetched data, the concealing method is selective according to the erroneous portion of data. If an error takes place in such data as visually impairing the reproduced image, the reproduced pixels of the error-occurring block are replaced with the reproduced pixels of the previous frame. In place, the erroneous coefficient is replaced with the coefficient at the same location of the previous frame.

If an error takes place in such data as not so impairing the reproduced image, the erroneous coefficient is made zero (0).

If an error takes place in such coefficients as giving a relatively large influence on the reproduced image and having a strong correlation with the peripheral blocks, the erroneous coefficient is replaced with the corresponding coefficient of the adjacent block.

Hence, the concealment system according to this invention is capable of processing the error occurring in any type of data so that an excellent image can be reproduced with a small error and no blur.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for concealing an error of a transform coding of a moving picture, said apparatus having
    coding means for error-correcting coding of image data and
    decoding means for decoding an error-correcting code created by said coding means, said decoding means comprising:
    first concealment means, for analyzing data according to a type of said data, said data being error-detected but not corrected by an error correction decoder in said decoding means, for replacing said data with zero when said data corresponds to data of a second frequency component, for replacing said data with data of a frequency component which is the same as a frequency component of a horizontally adjacent block when said data correspond to data of a third frequency component, and for replacing said data with data of a frequency component which is the same as a frequency component of a vertically adjacent block when said data correspond to data of a fourth frequency component; and second concealment means, connected to said first concealment means, for replacing reproduced pixel values of an error-occurred block with reproduced pixel values of a previous frame, in case said data being error-detected but not corrected is data of one of (A) a first frequency component and (B) an additional information.

2. An apparatus according to claim 1, wherein said second concealment means (22) is further adapted to replace said reproduced pixel values of said error-occurred block with said reproduced pixel values of said previous frame in case that said data being error-detected but not corrected is data of an additional information.

3. An apparatus according to claim 1, wherein
said first concealment means is adapted to output a specific signal in the event that said data is one of
(A) data of a first frequency component and
(B) data of an additional information, and
said second concealment means is adapted to replace said reproduced pixel values of said error-occurred block with said reproduced pixel values of said previous frame, according to said signal output from said first concealment means.

4. An apparatus according to claim 1, wherein
said data of said first frequency component comprise data of direct current components or lower frequency components in comparison with said second frequency component,
said data of said second frequency component comprise data of higher frequency components in comparison with said first frequency component,
said data of said third frequency component comprise data having a correlation with corresponding data in a horizontally adjacent block, and
said data of fourth frequency component comprise data having a correlation with corresponding data in a vertically adjacent block.

5. An apparatus for concealing an error of a transform coding of a digitized moving picture, said apparatus having
coding means for treating one field or one frame of said digitized moving picture as one screen, dividing data of one screen into a plurality of blocks, deriving a transform coefficient by orthogonally transforming image data contained in each block, quantizing the transform coefficient of each block with predetermined number of bits, error-correction-coding a quantized index together with an additional information indicating a number of bits in each quantized index,
said apparatus further having decoding means for decoding a code created by said coding means, said decoding means comprising:
first concealment means for analyzing data according to a type of said data, said data being error-detected but not corrected by an error-correction decoder in said decoding means, for outputting a specific signal when said data is one of
(A) data of a first frequency component and
(B) data of said additional information,
for replacing said data with zero when said data is data of a second frequency component, for replacing said data with data of the same frequency component from a horizontally adjacent block, when said data is data of a third frequency component, arid for replacing said data with data of the same frequency component from a vertically adjacent block when said data is data of a fourth frequency component; and second concealment means, connected to said first concealment means, for replacing reproduced pixel values of an error-occurred block with reproduced pixel values of a previous frame according to said signal output from said first concealment means, in the event that said data being error-detected but not corrected is one of
(A) data of said first frequency component and
(B) data of an additional information.

6. An apparatus according to claim 5, wherein
said data of said first frequency component comprise data of direct current components or lower frequency components in comparison with said second frequency component,
said data of said second frequency component comprise data of higher frequency components in comparison with said first frequency component,
said data of said third frequency component comprise data having a correlation with corresponding data in a horizontally adjacent block and said data of fourth frequency component comprise data having a correlation with corresponding data in a vertically adjacent block.

7. An apparatus for concealing an error of a transform coding of a digitized moving picture, comprising:
coding means for treating one field or one frame of said digitized moving pictures as one screen, dividing data of one screen into a plurality of blocks, deriving a transform coefficient by orthogonally transforming image data contained in each block, quantizing index together with an additional information indicating a quantizing bit number;
decoding means for decoding a code created by said coding means; and concealment means for analyzing data according to a type of said data, said data being error-detected but not corrected by an error correction decoder in said decoding means,
for replacing said data with data of the same frequency component from a block at the same location of a previous frame when said data is data of a first frequency component,
for replacing said data with zero when said data is data of a second frequency component, for replacing said data with data of the same frequency component from a horizontally adjacent block when said data is data of a third frequency component, and
for replacing said data with data of the same frequency component from a vertically adjacent block when said data is data of a fourth frequency component.

8. An apparatus according to claim 7, wherein
said data of said first frequency component comprise data of direct current components or lower frequency components in comparison with said second frequency component,
said data of said second frequency component comprise data of higher frequency components in comparison with said first frequency component,
said data of said third frequency component comprise data having a correlation with corresponding data in a horizontally adjacent block, and
said data of fourth frequency component comprise data having a correlation with corresponding data in a vertically adjacent block.

* * * * *